(12) United States Patent
Shaltiel et al.

(10) Patent No.: US 10,135,993 B2
(45) Date of Patent: Nov. 20, 2018

(54) SYSTEMS AND METHODS FOR MITIGATING AND/OR AVOIDING FEEDBACK LOOPS DURING COMMUNICATION SESSIONS

(71) Applicant: VONAGE BUSINESS INC., Atlanta, GA (US)

(72) Inventors: Natan Shaltiel, Tel-Aviv (IL); Yuval Golan, Rishon Le-zion (IL)

(73) Assignee: Vonage Business Inc., Atlanta, GA (US)

(*) Notice: Subject to any disclaimer, the term of this patent is extended or adjusted under 35 U.S.C. 154(b) by 89 days.

(21) Appl. No.: 15/168,583

(22) Filed: May 31, 2016

(65) Prior Publication Data

US 2017/0346950 A1 Nov. 30, 2017

(51) Int. Cl.
*H04M 3/42* (2006.01)
*H04M 3/56* (2006.01)
*H04M 1/60* (2006.01)
*H04M 3/22* (2006.01)

(52) U.S. Cl.
CPC ......... *H04M 3/568* (2013.01); *H04M 1/6033* (2013.01); *H04M 3/2236* (2013.01); *H04M 2203/2094* (2013.01)

(58) Field of Classification Search
CPC ........................... H04M 3/568; H04M 1/6033
USPC ............................................. 379/202.01, 158
See application file for complete search history.

(56) References Cited

U.S. PATENT DOCUMENTS

| | | | |
|---|---|---|---|
| 7,843,486 B1* | 11/2010 | Blair | H04M 3/568 348/14.01 |
| 8,488,745 B2 | 7/2013 | Cutler | |
| 2013/0230152 A1* | 9/2013 | Frauenthal | H04B 3/23 379/27.03 |
| 2013/0259251 A1 | 10/2013 | Bakalos | |
| 2015/0117626 A1 | 4/2015 | Nord | |
| 2016/0050491 A1* | 2/2016 | Ahgren | H04R 1/08 381/66 |
| 2016/0212273 A1* | 7/2016 | Tsypnyatov | H04M 3/562 |

FOREIGN PATENT DOCUMENTS

EP 3253039 A1 12/2017

* cited by examiner

*Primary Examiner* — William Deane, Jr.
(74) *Attorney, Agent, or Firm* — Moser Taboada; Joseph Pagnotta

(57) ABSTRACT

Methods and systems for facilitating a communication session receive a sound signal and determine at least one contributing source to the received sound signal from among a plurality of communication endpoints, wherein each respective communication endpoint of the plurality of communication endpoints is associated with a corresponding participant in the communication session and includes a microphone and loudspeaker. Based on a determination of multiple communication endpoints being co-located, one or more embodiments perform at least one of processing the received sound signal by selectively altering the received sound signal, or initiating an instruction to inhibit further contribution, to the sound signal, from at least one of the co-located multiple communication endpoints.

20 Claims, 9 Drawing Sheets

SYSTEMS AND METHODS FOR MITIGATING AND/OR AVOIDING FEEDBACK LOOPS DURING COMMUNICATION SESSIONS

BACKGROUND

Field

The present disclosure relates generally to telecommunications and, in an example embodiment, the disclosure relates to mitigating and/or avoiding feedback loops during communication sessions.

Description of the Related Art

In general a communication session is an interconnection between multiple participants simultaneously in different locations by way of communication endpoints (e.g., desktop phones, mobile terminals, and/or computers equipped with a microphone and speakers). The inventors herein have observed that during communication sessions such as conference calls, two or more communication endpoints—each associated with a different participant in the communication session—may be co-located (e.g., in the same room). By way of example, such co-location may be for the sake of convenience (e.g. to provide each user with access to his or her own computer screen or facilitate instant access to materials they may need during the communication session) or to enable two or more participants to view a common display screen.

Each co-located communication session participant may coordinate the muting of his or her own communication endpoint so that only one microphone and/or speaker is active at a given time. However, if they fail to do this, the inventors herein have observed that a loud and noisy feedback loop, perceptible by all participants in the communication session, is produced.

Accordingly, there is a need for improved methods and systems for mitigating and/or avoiding feedback loops during communication sessions.

SUMMARY

The inventors herein propose systems and methods operative to facilitate communication sessions in which at least some of the participants, and their respective communication terminals, may be co-located.

In some embodiments, a computer implemented method of facilitating a communication session comprises receiving, by a processor, a sound signal; determining, by the processor, at least one contributing source to the sound signal from among a plurality of communication endpoints, wherein each respective communication endpoint of the plurality of communication endpoints is associated with a corresponding participant in the communication session and includes a microphone and loudspeaker; and based on a determination of multiple communication endpoints being co-located, at least one of processing the received sound signal by selectively altering, by the processor, the received sound signal, or initiating an instruction to inhibit further contribution, to the sound signal, from at least one of the co-located multiple communication endpoints.

In some embodiments, a system for facilitating a communication session comprises a transceiver, a processor, and a memory containing instructions executable by the processor to receive a sound signal; to determine at least one contributing source to the sound signal from among a plurality of communication endpoints, wherein each respective communication endpoint of the plurality of communication endpoints is associated with a corresponding participant in the communication session and includes a microphone and loudspeaker; and based on a determination of multiple communication endpoints being co-located, to at least one of process the received sound signal by selectively altering, by the processor, the received sound signal, or to initiate an instruction to inhibit further contribution, to the sound signal, from at least one of the co-located multiple communication endpoints.

Other and further embodiments of the present invention are described below.

BRIEF DESCRIPTION OF THE DRAWINGS

So that the manner in which the above recited features of embodiments of the present disclosure can be understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the disclosure may admit to other equally effective embodiments.

Figure 1A:
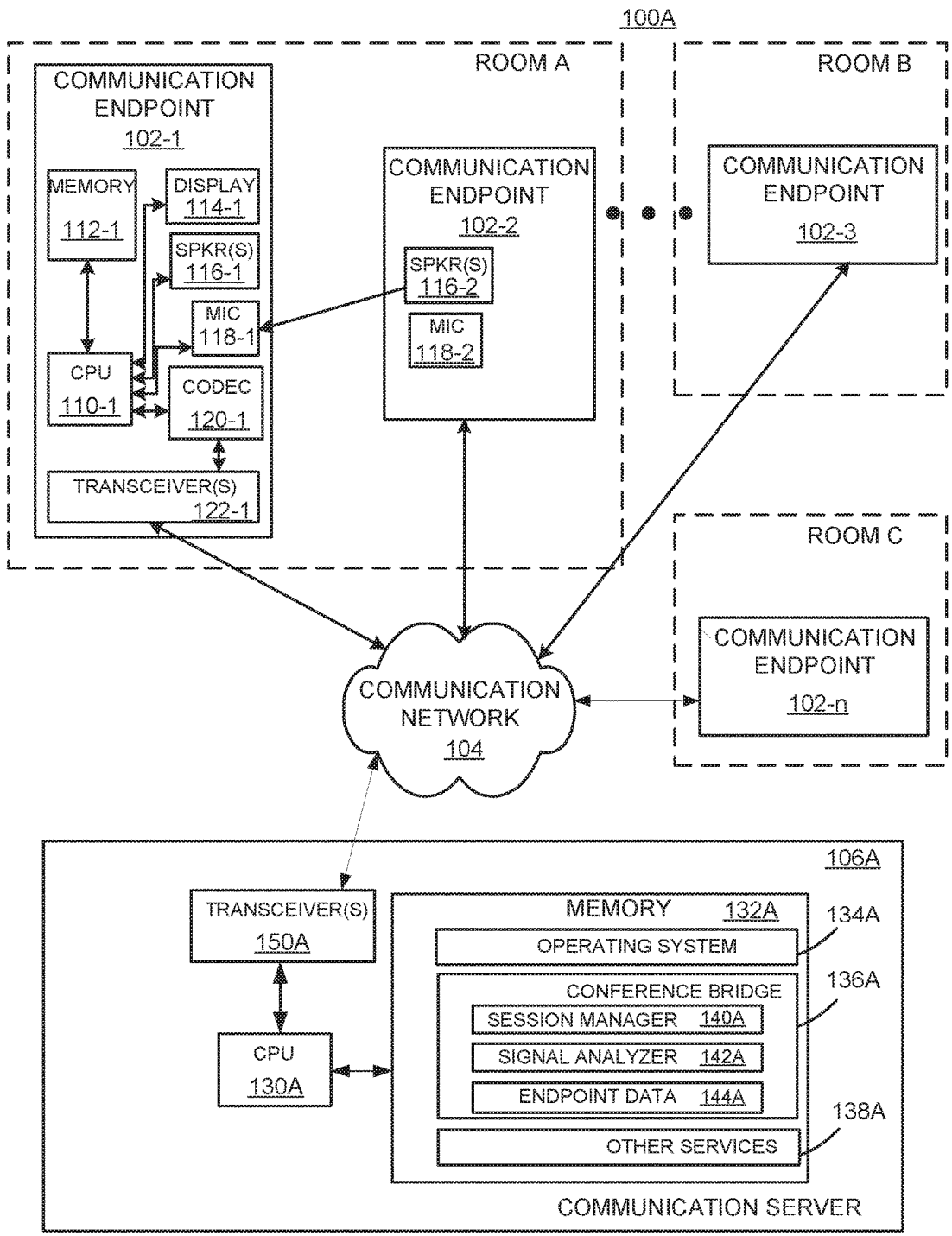
FIG. 1A is a block diagram depicting a communication system configured to facilitate avoidance or reduction of feedback noise in communication sessions, according to one or more server-side and/or client-server based embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a system and method for facilitating avoidance or reduction of feedback noise in communication sessions. Some exemplary embodiments consistent with the claimed invention improve upon standard conferencing functionality by enabling a server or one or more of the communication endpoints to determine whether two or more communication endpoints are being operated in the same location and, if so, to take appropriate action. In some embodiments, the action taken may include initiating the muting of the active speaker and/or microphone of a communication endpoint that is being operated to cause the feedback noise. In some embodiments, the action taken may be to alter the sound signals being distributed to the communication endpoint that is being operated to cause the feedback noise.

Based on the presence of a unique tone and/or other audibly reproducible signal component, which would normally be removed by conventional echo cancellation processes at the endpoint with which that signal component is associated, within the sound signals received at a server and/or an enhanced communication endpoint, another endpoint may be identified as a co-located source of feedback.

Where the communication session is a conference call, a determination can be made during an initial phase of the conference call (e.g., before the speakers begin talking), according to some embodiments, as to which communication endpoints are co-located. Based on the determination, the co-located users may be notified—via a suitable alert notification, that the microphone(s) of one or more of the co-located endpoints have been muted or, alternatively, that audio output to the speaker(s) of one or more of the co-located endpoints has been reversibly routed to the handset. In other embodiments, a communication session may be continuously monitored such that appropriate intervention may be taken at any time.

Various embodiments of systems and methods facilitating avoidance or reduction of feedback noise in communication sessions are provided below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1A is a block diagram depicting a communication system 100A configured to facilitate avoidance or reduction of feedback noise in communication sessions, according to one or more server-side and/or client-server based embodiments consistent with the present disclosure. According to some embodiments, communication system 100A includes one or more communication endpoints 102-1 to 102-n and a communication server 106A which exchange packetized voice and other data over a communication network 104 via one or more communication links.

Within continuing reference to FIG. 1A, it will be seen that each communication endpoint, as endpoint 102-1, includes at least one processor as CPU 110-1, a memory 112-1, a display 114-1, speaker(s) 116-1 which typically include both a loudspeaker and a handset speaker in the case of a mobile terminal or desk phone but may alternative include the adjunct and/or onboard speaker(s) associated with a laptop, desktop or tablet computer. Each endpoint, as endpoint 102-1 further includes a microphone 118-1, a codec 120-1 and one or more transceiver(s) 122.

The communication server 106A likewise includes one or more processors, as CPU 130A, one or more transceiver(s) 150A for mediating the exchange of data via network 104, and a memory 132A. In an embodiment, memory 132A of communication server 106A contains an operating system 134A executable by CPU 130A to implement instructions for implementing a conference bridge (server) 136A and, optionally, other services 138A such, for example, as voice messaging, e-mail, and voice communication sessions. Conference bridge server 136A includes a session management agent (session manager) 140A configured to authenticate each of the communication endpoints 102-1 to 102-n and to coordinate the messaging necessary to facilitate an exchange of sound signals (e.g., packetized voice data) and control instructions during the course of a communication session.

In one or more embodiments, conference bridge server 136A further includes a signal analyser 142A, and a repository for endpoint data 144A. The endpoint data 144A may include communication endpoint identifiers and designations of co-location status (associations) between one or more of the endpoints. According to some embodiments, signal analyser 142A determines, based on the presence of an identifying tone or other signal component—uniquely associated with a particular one of the communication endpoints—in the sound signal received from that particular endpoint, that there is at least one other co-located (e.g., near enough to be within the audible range of a microphone of the particular endpoint) endpoint. By way of example, if the signal analyser 142A detects the presence of a signal component uniquely associated with communication endpoint 102-1 in the sound signal received as packetized data sent from endpoint 102-2, then a determination is made that there is at least one other endpoint near enough to cause adverse noise feedback effects.

In some embodiments, the unique signal components may originate (e.g., be generated and incorporated into the sound signals distributed to the endpoints during a communication session) at the communication server 106A. Alternatively, or in addition, the unique signal components may be generated by those endpoints having the capability to do so, and then forwarded to the communication server 106A as part of packetized sound signals originating with such endpoints.

In some embodiments, such as where the other services 138A of communication server 106A includes a presence server (not shown) that enables the location of some or all of the communication endpoints to be determined, a determination of co-located endpoint status may alternatively, or additionally, be made based on the physical proximity of two or more endpoints as reported by the presence server.

In some embodiments, the transceiver(s) 150A of communication server 106A and the transceiver(s) 122-1 of each endpoint 102 comprises one or more network transceivers comprising, for example, transmission and receiving devices as transceivers compliant with corresponding transport or transmission protocol(s) such as IEEE 802.11, IEEE 802.13, BLUETOOTH, and/or cellular transmission protocols such as Code Division Multiple Access (CDMA), Time Division Multiple Access (TDMA) and/or Global System for Mobile communications (GSM).

In embodiments, a communication session module forming part of the other services of communication server 106A is configured, by execution of instructions by a processor, to perform functions of a SIP (Session Initiation Protocol) Proxy/Registrar, message exchange service, Group Chat Server lookup service, and/or Group Chat Server channel service. In addition or alternatively, the communication session module in some embodiments of system 100A is configured, by execution of instructions by a processor, to initiate and/or forward a telephone call via a communications network. The appropriate communication and messaging modules are, in some embodiments, resident in memory as instructions executable by CPU 130A. In some cases, one of these messaging modules (e.g., a voice messaging server) may constitute one of the communication endpoints participating in an exchange of sound signals during a communication session. In such cases, embodiments of the present invention would facilitate the prevention of messages containing adverse feedback noise from forming part of a voice mail message (or e-mail message containing voice message content).

Figure 1B:
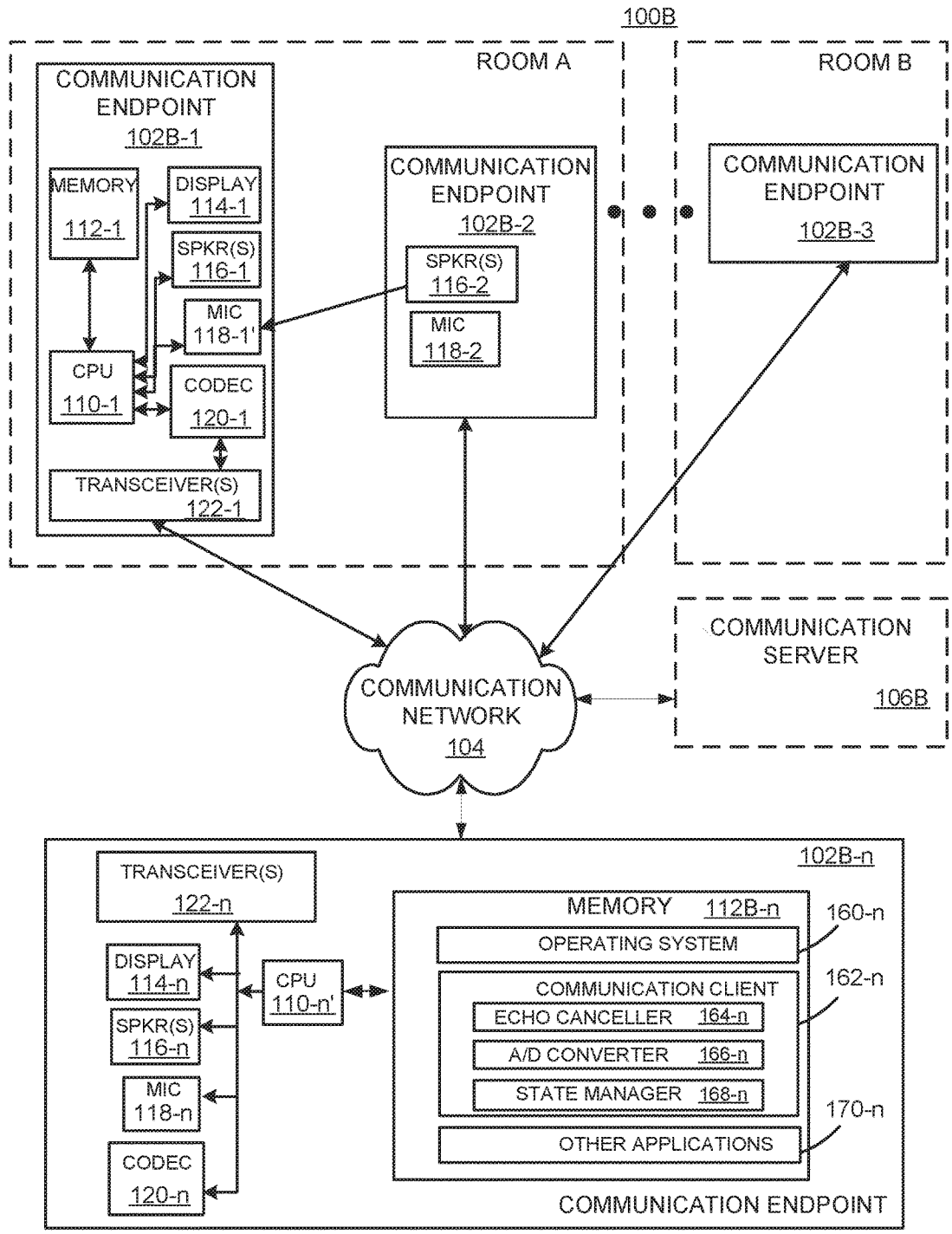
FIG. 1B depicts a block diagram of a communication system configured to facilitate avoidance or reduction of feedback noise in communication sessions, according to one or more client-side (e.g. "communication endpoint") centric embodiments.

FIG. 1B depicts a block diagram of a communication system 100B configured to facilitate avoidance or reduction of feedback noise in communication sessions, according to one or more client-side (e.g. "communication endpoint") centric embodiments. The arrangement of and interrelationships between the various functional components of the embodiment of FIG. 1B are very similar to those of the embodiment of FIG. 1A, and like elements are represented by like numerals throughout FIGS. 1A, 1B, and 1C, although only one communication endpoint indicated generally at 102B-n is depicted in FIG. 1B. Memory 112B-n of communication endpoint 102B-n includes operating system 160-n, a communication client application 162-n, and other applications 170-n such, for example, as web-browser, e-mail, native mobile telephony (if applicable), and image and/or video capture applications, among others. In addition to a suitable user interface for initiating a communication session with one or more other communication endpoints, the communication client application 162-n of communication endpoint 1-2B-n includes an echo canceller 164-n, an analog to digital (ND) converter 166-n, and a state manager 168-n.

A principal difference between the respective embodiments is that in the embodiment of FIG. 1B, each of communication endpoints 102B-1 to 102B-n incorporates its own unique identifying tone or other sound component into the packetized sound signal being sent upstream to the communication server 106B. Each endpoint, as endpoint 102B-n, includes an echo cancellation unit, as unit 164-n, which removes its own contribution of the unique identifying signal component to the upstream sound signal.

The server 106B, however, distributes the packetized sound signal from endpoint 102B-n (after any mixing, if applicable) to the other participating communication endpoints. If one of these participating endpoints is co-located with endpoint 102B-n, and that participating endpoint has not switched to handset mode, the signal component uniquely assigned with endpoint 102B-n may be audibly reproduced and received by the microphone of endpoint 102B-n. The acoustic input is converted by A/D converter 166-n. In client-centric embodiments consistent with the present disclosure, each endpoint is configured to track its state via state manager 168-n and to initiate appropriate action when it recognized its own unique sound component in the acoustically received input. At such point, for example, the endpoint may mute its own microphone, issue a request for the communication server 106B to mute the microphone of one or all of the other endpoints, or issue a request for the communication server to cause another of the endpoints to change its state from loudspeaker "ON" to loudspeaker "off". If two or more co-located endpoints are operating in an unmuted, speakerphone "on" state, each will typically initiate the same appropriate (corrective) action. As such, the server may readily determine which devices are co-located and which are not.

The illustrative embodiment of FIG. 1A may function very similar to the embodiment of FIG. 1B, except that the unique signal component(s) identifying each endpoint may, as noted previously, originate at the communication server 106A, and detection and appropriate corrective action may be initiated and/or implemented at the communication server 106A.

Figure 1C:
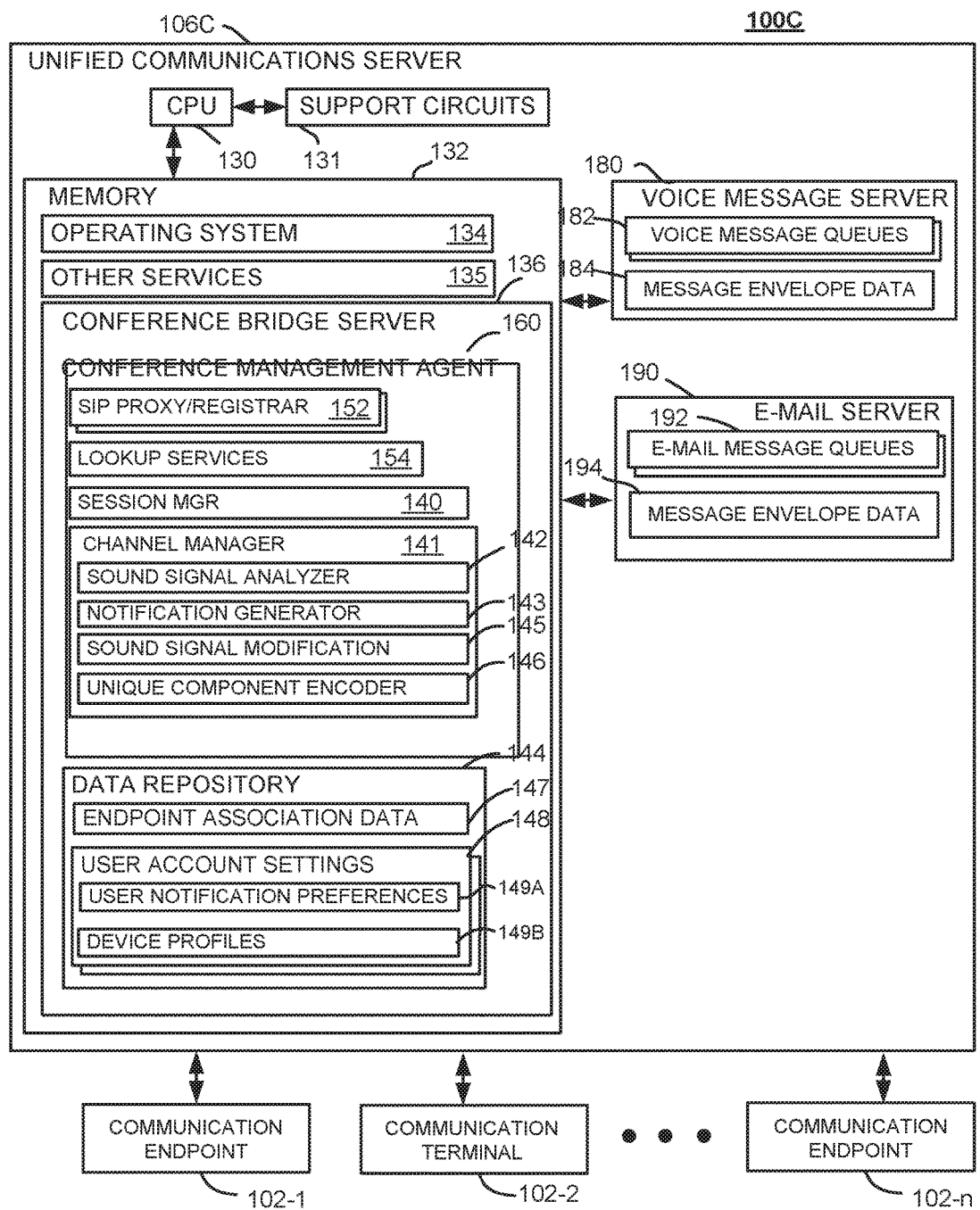
FIG. 1C is a block diagram depicting, in greater detail, the interaction between functional components according to some embodiments exemplified by FIG. 1A.

FIG. 1C is a block diagram depicting, in greater detail, the interaction between functional components in a communication system 100C comprising a unified communications server 106C according to some embodiments exemplified by FIG. 1A;

In some embodiments, the unified communications server 106C includes, in addition to the conference bridge server 136, a voice messaging and/or call server 180, text messaging server (not shown), e-mail server 190, proxy server(s), and a Lightweight Directory Access Protocol (LDAP) directory server (not shown). The various components of system 100C, including unified communication server 106C, and communication endpoints 102-1 to 102-n, are connected by one or more network links. Some of the links are established by a network, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

The various servers, as servers 136, 180, and 190 are each a computing device, or may be the same computing device as, for example, a desktop computer, laptop, tablet computer, and the like, or they may be cloud based servers e.g., a blade server, virtual machine, and the like. For each provisioned voice messaging user or subscriber, voice mail server 180 maintains a voice mail message queue 182 and message envelope data 184 indicating a date and time when a voice mail message was left for a provisioned user, an identification of the caller or caller's extension Of available), whether and when a voice mail message was forwarded to another extension (a voice message forwarded to another party qualifying as a "response" according to one or more embodiments), and an indication of a date and time when the user first accessed the voice mail. In some embodiments, server 180 further includes a speech-to-text interface (not shown) operative to convert voice messages into email messages.

For each provisioned email user or subscriber, email server 190 maintains an email message queue 192 and message envelope information 194 identifying the sender's email address, each recipient's email address, the date and time of delivery to an email inbox, and user account settings including rules and preferences defined by the user.

According to one or more embodiments, one or more Proxy server(s) and an LDAP directory server (not shown) may provide sender and recipient (and/or group) directory lookups as needed to support the exchange of messages between communication endpoints. In some embodiments, conferencing bridge server 136 includes a SIP proxy server comprising a SIP/Proxy registrar 152, lookup services 154, and a session manager 140, which collectively manage processes for authenticating users and the exchange of messages between the communication endpoints 102-1 to 102-n. Conferencing bridge server 136 further includes a data repository 144 which includes endpoint association data 147 and, in some embodiments, user account settings 148, that include user notification preferences 149A and communication endpoint (device profiles) 149B.

According to some embodiments, conference management agent 160 of conference bridge server 136 further includes a channel manager 141 comprising a set of instructions residing in memory 132 and executable by a Central Processing Unit (CPU) 130. The CPU 130 may include one or more commercially available microprocessors or microcontrollers that facilitate data processing and storage. Various support circuits 131 facilitate the operation of the CPU 130 and include one or more clock circuits, power supplies, cache, input/output circuits, and the like. The memory 132 includes at least one of Read Only Memory (ROM), Random Access Memory (RAM), disk drive storage, optical storage, removable storage and/or the like.

In addition to channel manager 141, memory 132 includes an operating system 134, and a plurality of other services 135 (e.g. applications) which may optionally include a speech-to-text converter (not shown). The operating system (OS) 134 generally manages various computer resources (e.g., network resources, file processors, and/or the like). The operating system 134 is configured to execute operations on one or more hardware and/or software modules, such as Network Interface Cards (NICs), hard disks, virtualization layers, firewalls and/or the like. Examples of the operating system 134 may include, but are not limited to, LINUX, MAC OSX, BSD, UNIX, MICROSOFT WINDOWS, and the like.

In some embodiments, server 106C interacts with a plurality of communication endpoints 102-1 to 102-n via a communication network. Each of the communication endpoints, as 102-1 also includes one or more processors, support circuits, and a memory containing an operating system and applications as shown, for example, in FIGS. 1A and 1B. Also associated with the communication endpoints, in some embodiments, is a display device (not shown) which may comprise a touch screen able to accept input from a user's finger or input from a stylus. In some embodiments, applications on the communication endpoints include a communication session module configured, by execution of CPU instructions, to set up a telephone call or send an SMS, IM chat, or MMS message to an intended recipient via the communication network.

Channel manager 141 includes a sound signal analyzer 142 for detecting the presence of one or more unique signal components, each associated with a respective one of a plurality of communication endpoints registered to participate in a communication session (e.g., in a conference call). The echo-cancellation function of a first endpoint (e.g., endpoint 102-1) will remove, from the upstream sound signal sent from the first endpoint to the server 106C for distribution to other conference participants and generated from audible reproduction and analog to digital conversion of the downstream sound signal received at the first endpoint from the server 106C, the associated first unique signal component incorporated into the downstream sound signal. However, the echo-cancellation function will not remove the signal component uniquely associated with the first endpoint if it is received at a second endpoint (e.g., endpoint 102-2), audibly reproduced by that second endpoint, and then captured by the microphone of the first endpoint and included in that first endpoint's upstream sound signal. As such, sound signal analyzer 142 detects the first endpoint's unique signal component in the first endpoint's own upstream signal and determines that this endpoint is a contributing source to a sound signal subject to adverse feedback noise.

Likewise, the sound signal analyzer 142 detects the unique signal component of the second endpoint 102-2 in the upstream signal sent from the first endpoint 102-1. As such, sound signal analyzer may also determine that the second endpoint 102-2 is a contributing source to a sound signal subject to adverse feedback noise. Based on this determination, an association between endpoints 102-1 and 102-2 is established, for the purposes of a current communication session, that the two endpoints are co-located. In embodiments, this association is stored as endpoint association data 147 within data repository 144 of conference bridge server 136.

If the microphone of the second endpoint 102-2 is active like that of the first endpoint 102-1, then a second upstream sound signal incorporating signal components unique to the first end point 102-1 and the second endpoint 102-2 will be received at the server 106C if the speaker of the first endpoint is in a loudspeaker "ON" state. A number of corrective actions may be taken by conference bridge server 136 in response to the aforementioned determination(s), depending in some cases on a set of default endpoint (device) profiles and/or user notifications. For example, in some embodiments, one or both of the endpoints 102-1 and 102-2 may be instantly placed in a microphone "mute" state and an alert may be presented—either visually by the display, if present, or audibly as, for example, a "whisper tone" or "whisper message" addressed only to the muted, co-located endpoint(s). In addition, or alternatively, one or both of the endpoints 102-1 and 102-2 may be instantly placed in "handset speaker only" whereby the corresponding loud speaker is disabled. In embodiments, any of these corrections may be subject to an override by one of the communication session participants, based on a presumption that with heightened awareness of the impact of their proximity, the participants will operate their endpoints in a better coordinated fashion. Alternatively, or in addition to altering the operating state of communication endpoint components, sound signal modification module 145 channel manager 141 may alter the downstream signal by deleting or ignoring the contribution of one of the endpoints 102-1 and 102-2 until the users thereof initiate appropriate action (e.g., properly coordinated operation of the endpoints) manually.

In some embodiments, the channel manager 141 of conference management agent further includes a notification generator 143 and a unique signal component encoder 146. In some embodiments, the notification generator generates and incorporates into the corresponding downstream signal sent to each respective endpoint, at least one unique signal component. If only one endpoint is actively transmitting packetized sound (e.g., voice) signals upstream to the server 106C at a point in time, then each endpoint will receive a downstream version of the packetized sound signal which has been modified to include not only its own uniquely associated signal component but also the one associated with the active endpoint. Likewise, if multiple endpoints are actively transmitting packetized sound (e.g., voice) signals upstream to the server 106C at a given point in time, then each endpoint will receive a downstream version of the packetized sound signal which has been modified to mix the active input and include not only its own uniquely associated signal component but also the ones associated with the active endpoints.

Figure 2:
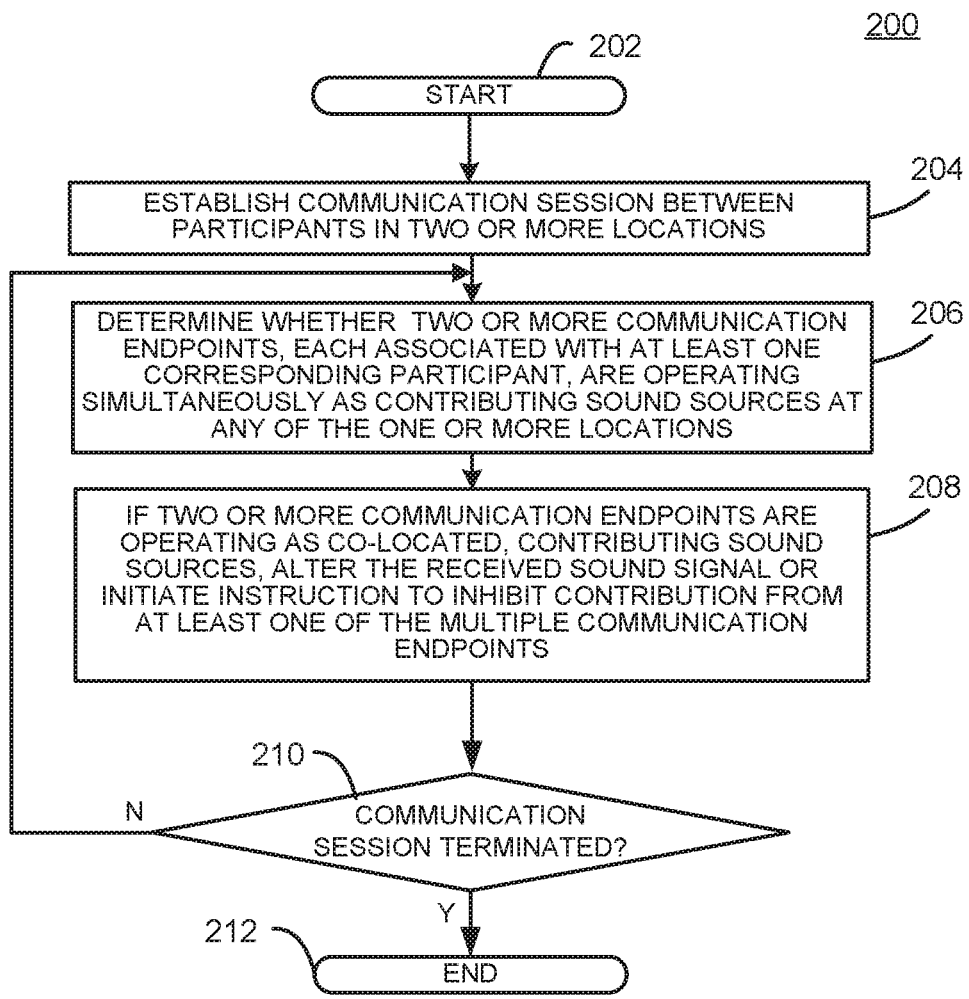
FIG. 2 is a flow diagram of a method for facilitating avoidance or reduction of feedback noise in communication sessions, according to one or more embodiments consistent with the present disclosure.

FIG. 2 is a flow diagram of a method 200 for facilitating avoidance or reduction of feedback noise in communication sessions, according to one or more embodiments consistent with the present disclosure. The method 200 starts at 202, and generally proceeds to 204.

At 204, a communication session is established between participants in two or more locations. In a SIP (Session Initiation Protocol) mediated session, for example, a series of invite and acknowledge messages may be exchanged, during which the users of respective endpoints may be authenticated using a conventional log-in procedure. Once the session has been established, the method 200 proceeds to 206, where a determination is made as to whether two or more communication endpoints, each associated with at least one corresponding participant, is being operated at the same time as contributing sound sources at a single location. From 206, method 200 proceeds to 208.

At 208, appropriate action is taken if two or more communication endpoints are determined to be operating as co-located contributors to a sound signal during the communication session (e.g., in sufficient proximity as to present a risk of adverse feedback noise when the microphone(s) and/or loudspeaker(s) of each communication endpoint are operated at the same time). In some embodiments, the upstream sound signals received from one or more of the co-located communication endpoint(s) is/are altered (e.g., by not including one or both of them in a corresponding downstream sound signal being sent to the endpoints participating in the communication session) as a mixture of sound simultaneously received from endpoints at the two or more locations.

In addition, or as an alternative to altering the sound signal, an instruction may be initiated to inhibit further simultaneous contribution from at least one of the co-located communication endpoints. Such instruction may comprise, in the case of a server-centric implementation utilizing SIP messaging, sending an INFO message from the server to instruct one or more endpoint(s) to modify its respective media (i.e., to enter a mute state where the endpoint does not transmit an upstream sound signal to a server). In a client centric model, the endpoint which makes the determination at 204 may originate the INFO message. At 210, a determination is made as to whether the communication session is to be terminated. If not, the method returns to 206 and continues. If so, the method 200 proceeds to 212 and terminates.

Figure 3:
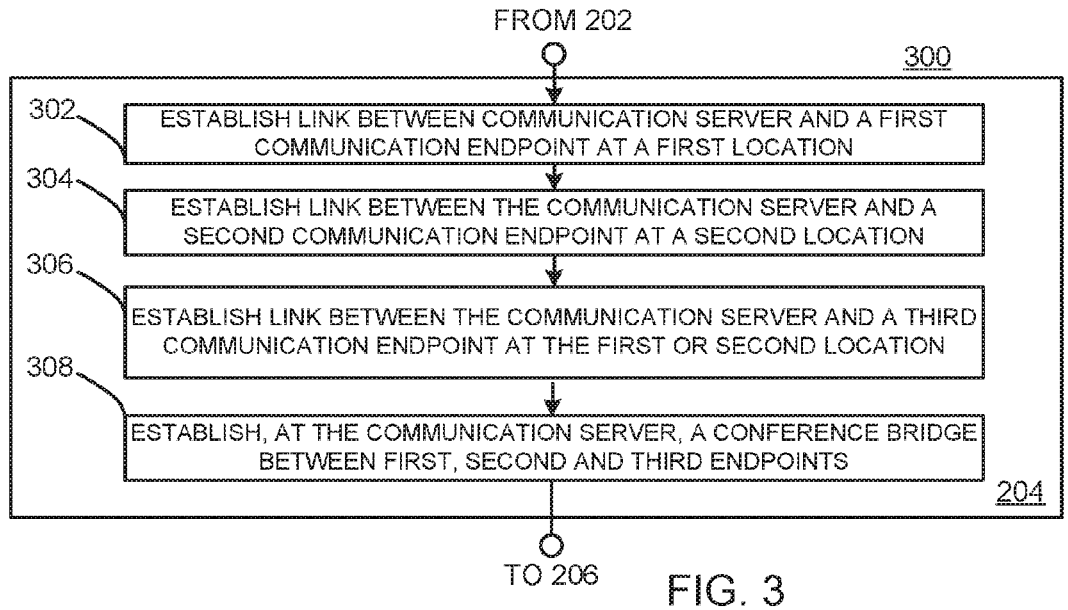
FIG. 3 is a flow diagram of a method for establishing a communication session among a plurality of distributed and/or co-located users of communication endpoints, as, for example, a sub-process of the method of FIG. 2, according to one or more embodiments consistent with the present disclosure.

FIG. 3 is a flow diagram of a method 300 for establishing a communication session among a plurality of distributed and/or co-located users of communication endpoints, as, for example, a sub-process corresponding to 204 of the method of FIG. 2, according to one or more embodiments consistent with the present disclosure. In some embodiments, the method 300 is entered at 302, where a communication link is established between a communication server and a first communication endpoint at a first location. The method proceeds to 304, where a communication link is established between the communication server and a second communication endpoint at a second location. The method then proceeds to 306, where a communication link is established between the communication server and a third communication endpoint at the first or the second location. The method then proceeds to 308, where a conference bridge is established at the communication server between the first, second and third communication endpoints. In an embodiment, the method 300 proceeds from 308 by re-entering method 200 at 206.

Figure 4:
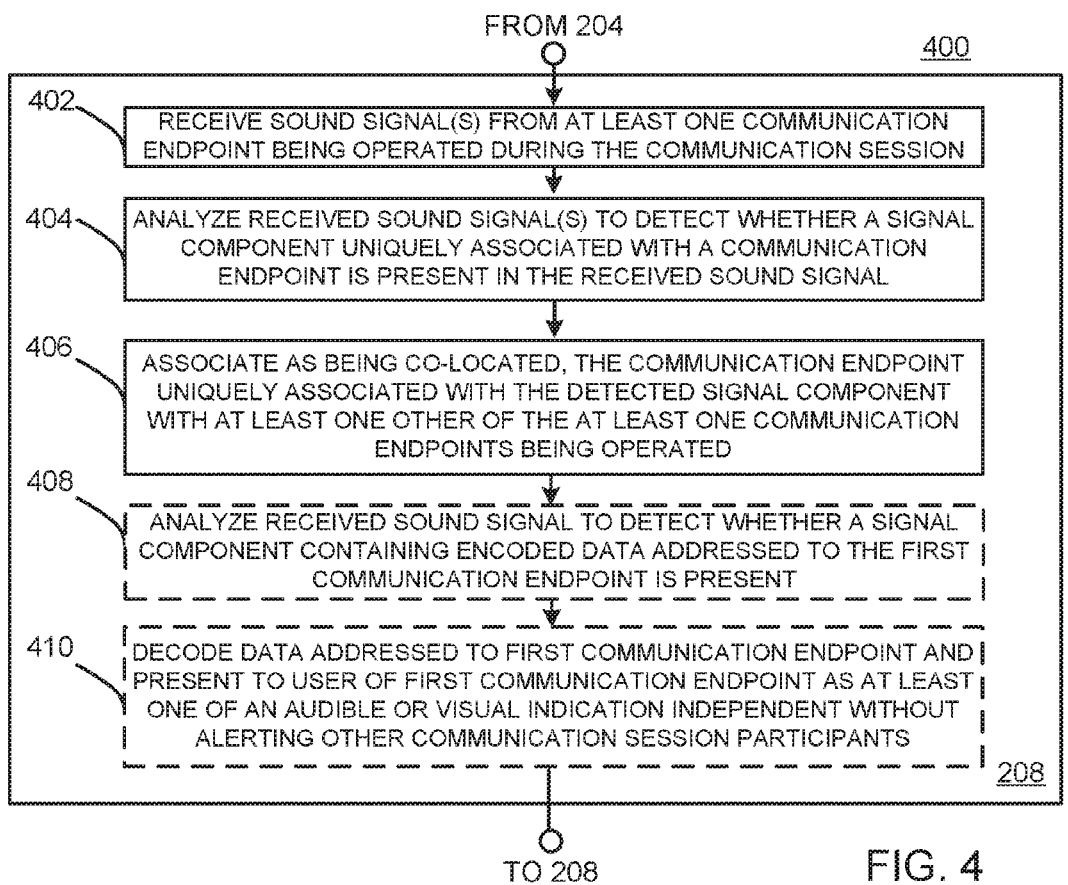
FIG. 4 is a flow diagram of a method for determining whether one or more communication endpoints being operated during a communication session are co-located, as, for example, a sub-process of the method of FIG. 2, according to one or more embodiments of consistent with the present disclosure.

FIG. 4 is a flow diagram of a method 400 for determining whether one or more communication endpoints being operated during a communication session are co-located, as, for example, a sub-process of the method of FIG. 2, according to one or more embodiments of consistent with the present disclosure. In some embodiments, the method 400 is entered at 402, where method 400 receives upstream sound signal(s) from at least one communication endpoint being operated during the communication session. The method proceeds to 404 where each received upstream sound signal is analyzed to detect whether a signal component uniquely associated with a communication endpoint is present in the received upstream sound signal(s). From 404, the method 400 proceeds to 406, where the communication endpoint uniquely associated with the detected signal component is associated, as being co-located, with at least one other of the communication endpoint being operated during the communication session. From 406 method 400 may re-enter method 200 at 208 or, optionally, proceed to 408 where a downstream signal received by an endpoint or an upstream signal received by a server is analyzed to detect whether a signal component containing encoded data, for communicating an alert or notification, is present. The method 400 proceeds to 410, where encoded data present is decoded and, if applicable, a visual and/or notification is presented to one or more designated recipients. From 408 or 410, method 400 may return to method 200 at 208.

Figure 5:
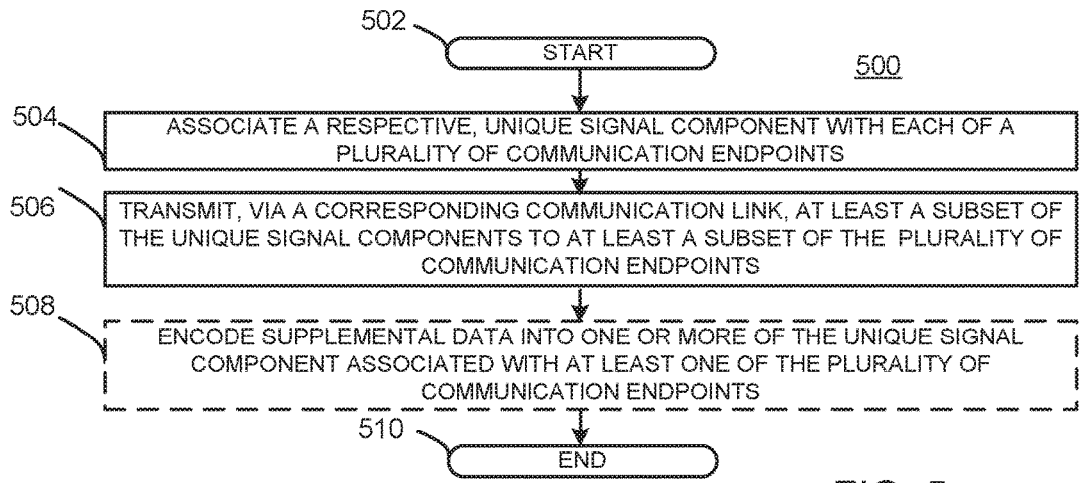
FIG. 5 is a flow diagram of a method for facilitating a determination of whether one or more communication endpoints being operated during a communication session are co-located, as, for example, a sub-process of the method of FIG. 2 and/or FIG. 4, according to one or more embodiments consistent with the present disclosure.

FIG. 5 is a flow diagram of a method 500 for facilitating a determination of whether one or more communication endpoints being operated during a communication session are co-located, as, for example, a sub-process of the method of FIG. 2 and/or FIG. 4, according to one or more embodiments consistent with the present disclosure. The method 500 is entered at 502, and proceeds to 504 where a respective unique signal component is associated with each of a plurality of communication endpoints. From 504, method 500 proceeds to 506 where at least a subset of the unique signal components is transmitted, via a corresponding communication link, to at least a subset of the plurality of communication endpoints.

In one or more embodiments, each unique signal component is audibly reproducible by the loudspeaker of a communication endpoint. In some embodiments, the unique signal component is outside of the range of the human auditory system (HAS) to perceive the unique signal component when it is audibly reproduced. It has been demonstrated that, in the temporal domain, the HAS is insensitive to small signal level change and peaks in the pre-echo and decaying echo spectrum. Thus, for example, one conventional approach to the incorporation of a unique signal component consistent with the present disclosure would be to embed data uniquely identifying each endpoint as a series of decaying echoes to place a peak in the audibly reproducible sound signal cepstrum. Such a watermarking approach can be used to embed not only a unique identifier associated with precisely one endpoint, but also to embed other data such as alerts, notifications and other information of interest to the user of the applicable endpoint. Such an optional encoding operation is performed at optional block 508 of method 500.

It should be noted that even a simple dual-tone multi-frequency (DIME) signaling tone, or a tone of high enough pitch and frequency, may be used as a unique signal component for purposes consistent with the present disclosure. In general, it is desirable to use unique signal components which are capable of surviving such typical telecommunication processes as ND conversion, D/A conversion and audio compression. From 506 or 508, method 500 proceeds to 510 and terminates.

Figure 6:
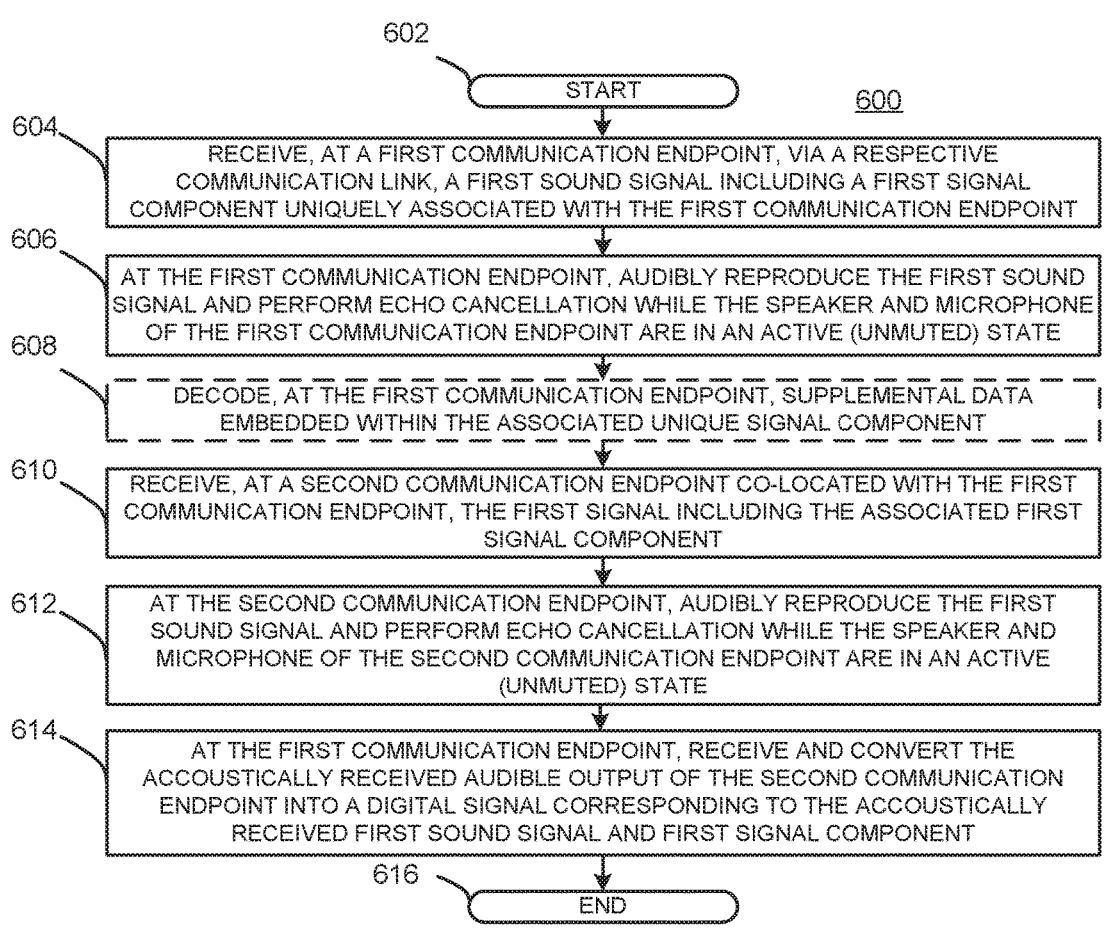
FIG. 6 is a flow diagram of a method for facilitating a determination of whether one or more communication endpoints being operated during a communication session are co-located, as, for example, a sub-process of the method of FIG. 2, FIG. 4, and/or FIG. 5, according to one or more embodiments consistent with the present disclosure.

FIG. 6 is a flow diagram of a method 600 for facilitating a determination of whether one or more communication endpoints being operated during a communication session are co-located, as, for example, a sub-process of the method of FIG. 2, FIG. 4, and/or FIG. 5, according to one or more embodiments consistent with the present disclosure. The method 600 is entered at 602 and proceeds to 604. At 604, a first sound signal including a first sound signal component uniquely associated with and identifying a first communication endpoint is received at the first communication endpoint via a network communication link. The method 600 proceeds from 604 to 606. At 606, the first sound signal is audibly reproduced at the first communication endpoint, and echo cancellation is performed at the first communication endpoint while the microphone and at least one speaker of the first communication endpoint are active.

Optionally, method 600 proceeds from 606 to 608, where supplemental data embedded within the unique signal component is decoded and used by the first communication endpoint to display and/or audibly reproduce a notification message, alert, or other message addressed to the first communication endpoint. Otherwise, method 600 proceeds from 606 directly to 610, where the first signal including the associated first signal component is received at a second communication endpoint co-located with the first communication endpoint. From 610, the method proceeds to 612, where the first sound signal is audibly reproduced at the second communication endpoint, and echo cancellation is performed at the second communication endpoint while the speaker and microphone of the second communication endpoint are in an active (unmuted) state. From 614, the method 600 proceeds to 614.

At 614, the microphone of the first communication endpoint acoustically receives the first sound signal audibly reproduced by the second communication endpoint. An analog-to-digital (A/D) converter of the first communication endpoint converts the acoustically received first signal and sends the converted output to a conference server as part of the upstream signal. From 614, method 600 proceeds to 616 and terminates.

Figure 7A:
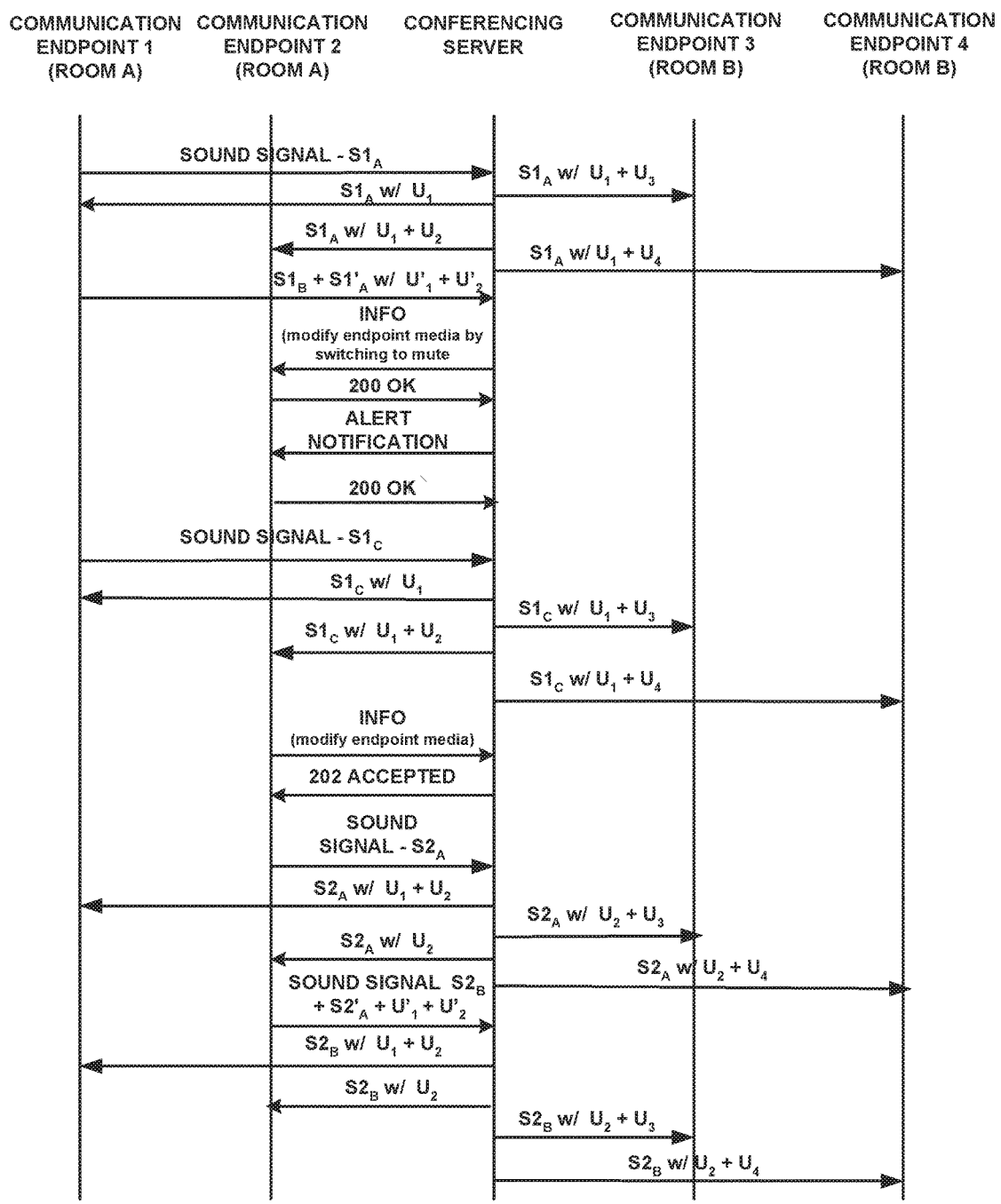
FIG. 7A is a message flow diagram depicting the development, flow and processing of sound signals and instruction messages between communication endpoints and a conferencing server according to one or more embodiments.

FIG. 7A is a message flow diagram 700 depicting the development, flow and processing of sound signals and instruction messages between communication endpoints and a conferencing server according to one or more embodiments.

In embodiments exemplified by FIG. 7A, a first of two communication sessions (during which sound signals $S1_A$, $S1_B$ and $S1_C$ originate at a first endpoint) has already been established among a plurality of communication endpoints (i.e., endpoints 1, 2, 3, and 4) wherein a first pair of the endpoints are co-located (i.e., present in Room A) and a second pair of endpoints are co-located (i.e., present in Room B). The microphone and speaker(s) of endpoint 1 are active, and sound signals S1 represented by packetized data, are sent upstream to a conferencing server. The conferencing server mixes the input of all endpoints which are contributing sources (in the case of FIG. 7A, only endpoint 1 has an active microphone while all endpoints have an active speaker).

To the upstream sound signal $S1_A$, the communication server adds the unique identifier signal component $U_1$ to the downstream signal sent to endpoint 1. To the downstream signal sent to endpoint 2, the communication server adds the unique identifier signal components $U_1$ and $U_2$ to the upstream sound signal $S1_A$ To the downstream signal sent to endpoint 3, the communication server adds the unique identifier signal components $U_1$ and $U_3$ to the upstream sound signal $S1_A$ Finally, to the downstream signal sent to endpoint 4, the communication server adds the unique identifier signal components $U_1$ and $U_4$ to the upstream sound signal $S1_A$.

The identifier signal component $U_1$ is removed at endpoint 1 by, for example, a conventional echo cancellation process. However, since the loudspeaker of endpoint 2 is in an active state, the microphone of endpoint 1 receives the acoustic output from endpoint 2. As a result, the signal $S1_B$, corresponding to the next sound signal sent by endpoint 1, includes feedback noise in the form of a version of $S1_A$ acoustically received (as signal $S1'_A$) from endpoint 2. Owing to the presence of unique identifier signal components $U_1$ and $U_2$ in the version of signal $S1_A$ received at and audibly reproduced by endpoint 2 and received from endpoint 2 at endpoint 1 as $S1'_A$, the subsequent signal $S1_B$ also includes acoustically received versions of the accompanying unique identifier signal components, indicated at $U'_1$ and $U'_2$. The conferencing server determines, from the presence of signal component $U'_2$, that communication endpoint 2 is the source of the feedback noise $S1'_A$. The conferencing server also determines, from the presence of signal component $U'_1$—in the received signal $S1_B$ coming from the very endpoint which should have removed it (by echo cancellation)—that the feedback noise $S1'_A$ attributable to endpoint 2 was received at endpoint 1. These two endpoints are thus treated as being co-located in accordance with one or more embodiments of the present disclosure.

A variety of actions affecting the operation of the endpoints 1 and 2 may be initiated in response to a determination that they are co-located. In some embodiments, for example, the conferencing server reacts by sending an INFO message which directs endpoint 2 to switch to a muted loudspeaker mode of operation. Alternatively, or in addition, the conference server may react by sending an INFO message to one or both of the co-located endpoint(s) which causes one or both of them to switch to a headset mode of operation (if supported). Because directional microphones are typically used in headsets and handsets, the risk of feedback noise being introduced by a co-located endpoint is reduced and/or eliminated entirely. In yet another alternative, an INFO message may be sent to both of the co-located endpoints to mute the microphone of each endpoint, allowing the loudspeaker of each to continue operating.

In response to receipt of an INFO message, an acknowledgement such, for example, as a "200 OK" message in the case of the illustrative Session Initiation Protocol (the "SIP" protocol) may be sent from the endpoint(s). Such a message serves to confirm compliance with the instruction to enter, for example, a muted state. When endpoint 1 sends subsequent sound signals (e.g., $S1_C$), any feedback noise and acoustically received identifiers $U'_{11}$ and $U'_2$ which might have otherwise been introduced acoustically to endpoint 1 by endpoint 2 is substantially or entirely avoided. To alert the user of an endpoint, as endpoint 2, of entry into a different mode of operation, an alert notification message may be sent by the conferencing server to one or both of the co-located endpoint(s). In embodiments consistent with FIG. 7A, an alert notification message is sent to endpoint 2 to initiate presentation of a visual and/or audible alert at that endpoint.

At some point, the user of endpoint 2 and the user of endpoint 1 may reach an understanding that endpoint 2 may revert to speaker mode and endpoint 1 will enter a mute state. At such point, an INFO message may be sent from endpoint 2 as shown and, once acknowledgement (e.g., "202 ACCEPTED" in the illustrative SIP protocol) from the server is received, endpoint 2 transitions from the handset to a speakerphone mode of operation.

If the endpoints 1 and 2 are, in fact, be desktop phones or computers with a static location, a prior determination of their status as co-located endpoints may be applied to all future communication sessions involving those endpoints, as by recording the association between these endpoint in a data table. In that regard, entries in such a table may be also be made, albeit on a temporary basis, for mobile communication endpoints such as smart phones, tablet computers, and notebook computers. Location data may be supplied, for example, using GPS or RF triangulation data, room number data in a database accessed via LDAP (lightweight directory access protocol) database, or by treating a prior determination co-located status (as made based on the earlier receipt of signal $S1_A$) as valid for an interval of limited duration and/or for the length of the present communication session.

For purposes of illustration, sound signals $S2_A$ and $S2_B$ of FIG. 7A should be understood as having originated at a mobile terminal during a different communication session than the one which included $S1_A$ to $S1_C$, with the two communication sessions being separated by an interval too large to support an inference that the endpoints 1 and 2 are still co-located. With such understanding, the remaining flow of messages in FIG. 7A illustrate that rather than altering the operating state of one or more endpoint microphone and/or headphone components, a server may simply remove, from the sound signal $S2_B$ sent downstream after receipt from endpoint 2, the contribution of endpoint 1 (i.e., after characterizing that contribution as feedback noise). Here, a first sound signal $S2_A$ received from endpoint 2 contains the unique components $U_1$ and $U_2$. The endpoint 1 receives and audibly reproduces the first signal $S2_A$. The audibly reproduced signal $S2_A$, together with the unique identifiers $U_1$ and $U_2$ is, in turn, acoustically received at the microphone of endpoint 2 and results in the generation of feedback noise signals $S'2_A$ which, in turn, also comprises acoustically derived unique identifiers $U'_1$ and $U'_2$.

The subsequent signal $S2_B$ sent upstream to the conferencing server is thus accompanied by feedback noise $S'2_A$, identifier $U'_1$, and identifier $U'_2$. When the signal comprising signal $S2_B$ and $S2'_A$ arrives at the conferencing server, the conferencing server determines, by detecting the presence of signal components $U'_1$ and $U'_2$, that endpoint 1 is a potential contributor of feedback noise to any input received at endpoint 2. In embodiments consistent with the present disclosure, the conferencing server reacts to the determination by withholding the audio input from endpoint 1 during the audio mixing process by which audio contributions received from any endpoints participating in a conference call are combined.

Thus, in some embodiments, the server may prevent introduction of the input contributed from the first endpoint so as to form a mixed audio signal which does not include the feedback noise. In some embodiments, the server may discontinue sending sound signals to the endpoint 1 altogether, send an appropriate notification alerting the user of endpoint 1 to such discontinuation, and then monitor for a message from endpoint 1 indicating a request to restore the status of the first endpoint as a recipient.

Figure 7B:
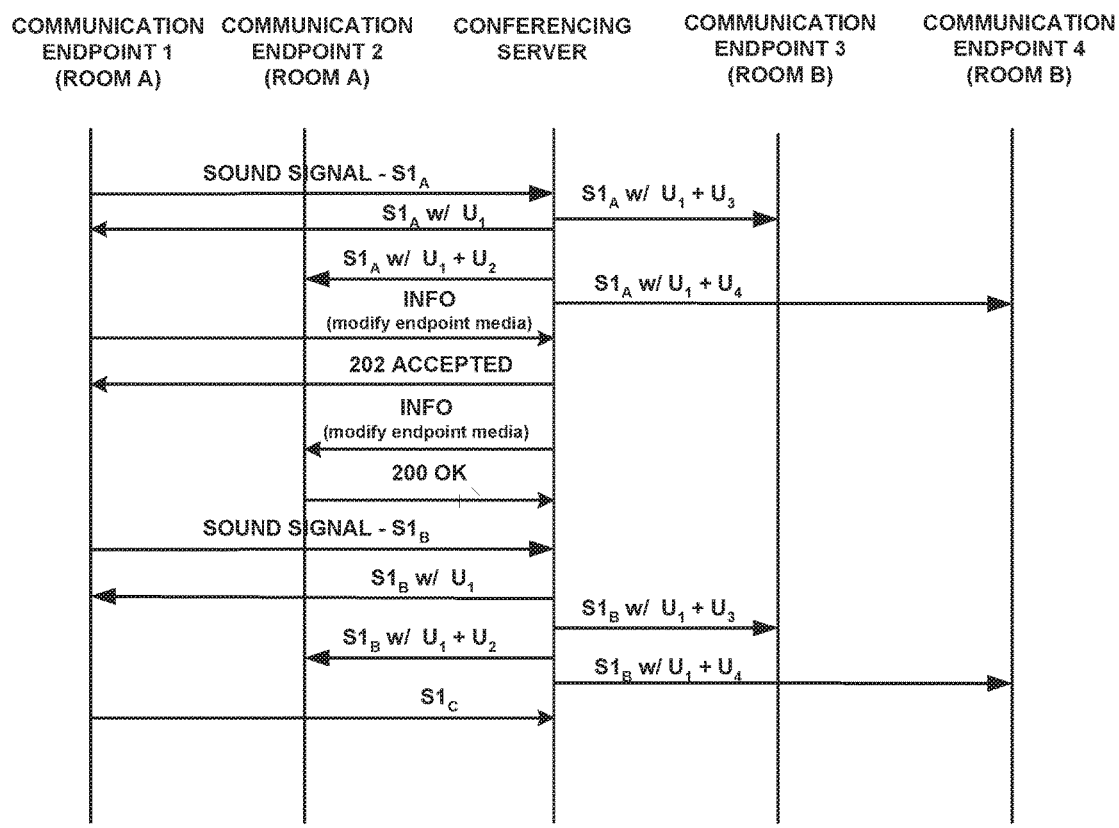
FIG. 7B is a message flow diagram depicting the development, flow and processing of sound signals and instruction messages between communication endpoints and a conferencing server according to one or more embodiments.

FIG. 7B is a message flow diagram depicting the development, flow and processing (method 710) of sound signals and instruction messages between communication endpoints and a conferencing server according to one or more embodiments. The flow of FIG. 7B is similar to that shown in FIG. 7A, except that the endpoints, as endpoint 1, initiate corrective action via, in one case, sending an INFO message to the server which, in turn, responds by sending a mute or other state change request to endpoint 2 when the two endpoints are determined to be co-located contributing sources of feedback noise. Once this has been done, subsequent sound signals originating at endpoint 1 are free of the adverse feedback from endpoint 2.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java™, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
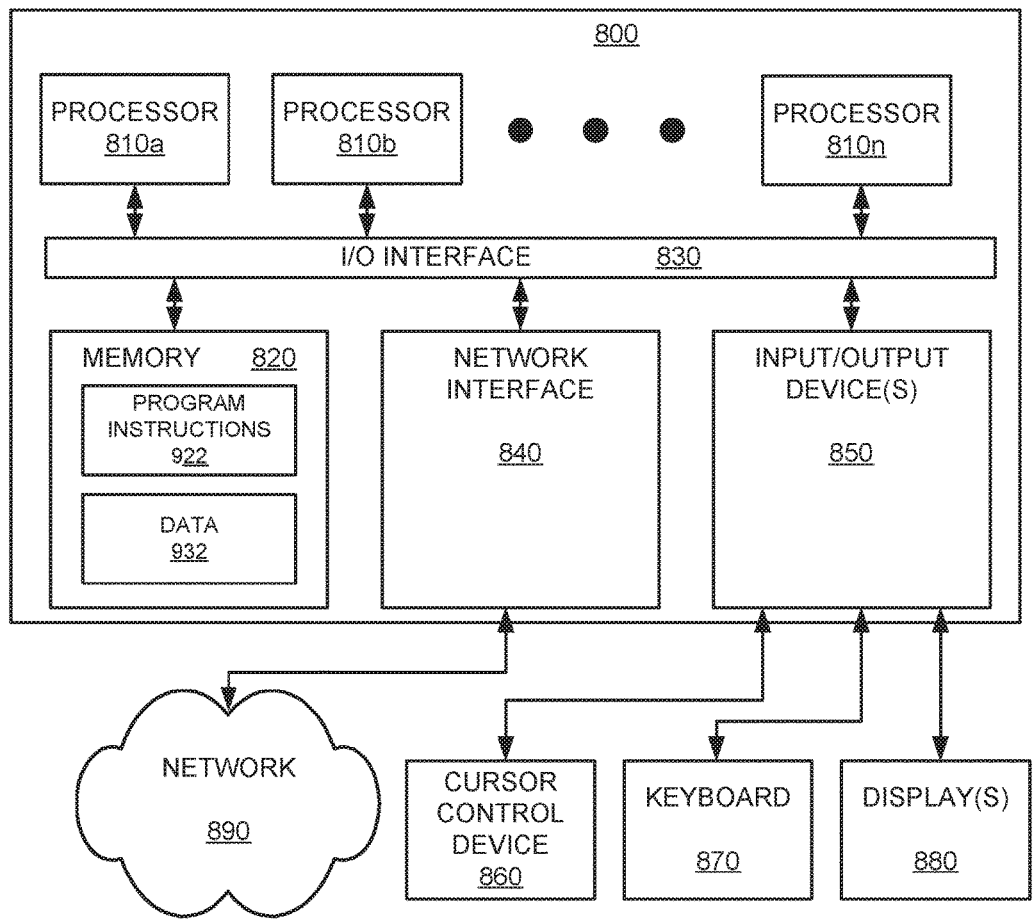
FIG. 8 is a detailed block diagram of a computer system, according to one or more embodiments.

FIG. 8 is a detailed block diagram of a computer system 800, according to one or more embodiments, that can be utilized in various embodiments of the present disclosure to implement the computer and/or the display devices, according to one or more embodiments. Various embodiments of method and apparatus for facilitating avoidance or reduction of feedback noise in communication sessions, as described herein, may be executed on one or more computer systems, which may interact with various other devices. One such computer system is computer system 800 illustrated by FIG. 8, which may in various embodiments implement any of the elements or functionality illustrated in FIGS. 1-7B.

In various embodiments, computer system 800 may be configured to implement methods described above. The computer system 800 may be used to implement any other system, device, element, functionality or method of the above-described embodiments. In the illustrated embodiments, computer system 800 may be configured to implement method 200 (FIG. 2), method 300 (FIG. 3), method 400 (FIG. 4), method 500 (FIG. 5), method 600 (FIG. 6), method 700 (FIG. 7A) and/or method 710 (FIG. 7B) as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 900 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 920 or computer system 900.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 930 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more display devices (not shown), or one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more communication terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 2-6. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:
1. A method of mitigating adverse effects of co-located communication endpoints during a communication session, comprising:
 receiving, by a processor, a sound signal, comprising a voice data component and a uniquely identifying tone component from a first communication endpoint of a plurality of communication endpoints;

continuously determining, by the processor, that two or more of the plurality of communication endpoints, each associated with at least one corresponding participant, are co-located when the sound signal comprising the unique identifying tone from the first communication endpoint is received from a second communication endpoint of the two or more endpoints; and based on the determination of multiple communication endpoints being co-located, at least one of processing the received sound signal by selectively altering, by the processor, the received sound signal, or initiating an instruction to inhibit contribution, to the sound signal, from at least one of the co-located multiple communication endpoints.

2. The method of claim 1, wherein the communication session is a conference call and wherein the method further includes registering each communication endpoint as a participant in the conference call, wherein each communication endpoint includes a microphone and loudspeaker.

3. The method of claim 1, wherein the sound signal is received at a server, and wherein at least one of the receiving, determining, or processing is performed at the server.

4. The method of claim 3, wherein the sound signal is a first sound signal received from a first of the communication endpoints, and the method further comprises receiving, at the server, a second sound signal received from a second of the communication endpoints.

5. The method of claim 4, wherein the determining comprises identifying in at least one of the first sound signal or the second sound signal, by the processor, at least one of a first signal component uniquely associated with the first communication endpoint or a second signal component uniquely associated with the second communication endpoint.

6. The method of claim 5, wherein the determining comprises identifying in at least one of the first sound signal or the second sound signal, by the processor, the first signal component and the second signal component.

7. The method of claim 6, further comprising incorporating the first signal component within the first sound signal after initial audible reproduction of the first signal component by the second communication endpoint, and incorporating the second signal component within the second sound signal in response to audible reproduction of the second signal component by the first communication endpoint.

8. The method of claim 7, wherein incorporating the first signal component is performed at the first communication endpoint and incorporating the second signal component is performed at the second communication endpoint.

9. The method of claim 7, wherein at least one of the first signal component or the second signal component is generated by the server, and a determination of multiple communication endpoints being co-located is made, by the processor, when at least one of the first signal component is present in the received first sound signal or the second signal component is present in the received second sound signal.

10. The method of claim 5, further comprising incorporating the first signal component into the first sound signal in response to initial audible reproduction of the first signal component by the second communication endpoint.

11. The method of claim 10, wherein incorporating the first signal component is performed at the first communication endpoint, and wherein a determination of multiple communication endpoints being co-located is made, by the processor, when the first signal component is present in the received first sound signal.

12. The method of claim 11, further including encoding, into the first signal component, data corresponding to a notification for at least one of visual or audible presentation to a user of a communication endpoint other than the first communication endpoint.

13. The method of claim 1, wherein the sound signal is received at a first communication endpoint of the plurality of endpoints, and wherein at least one of the receiving, determining, or processing is performed at the first communication endpoint.

14. The method of claim 13, wherein the determining comprises identifying, in the received sound signal, at least one of a first signal component uniquely associated with the first communication endpoint or a second signal component uniquely associated with a second communication endpoint of the plurality of communication endpoints.

15. The method of claim 14, wherein a determination of multiple communication endpoints being co-located is made when the first signal component is audibly reproduced at the second communication endpoint and detected at the first communication endpoint.

16. The method of claim 14, wherein an instruction to inhibit further contribution from the second communication endpoint is generated, by a processor associated with a server, in response to a request to the server received from the first communication endpoint.

17. The method of claim 16, wherein the instruction generated to inhibit further contribution from the second communication endpoint is executed, by a processor associated with the second communication endpoint, to cause muting of a loudspeaker of the second communication endpoint.

18. A system for mitigating adverse effects of co-located communication endpoints during a communication session, comprising:

a transceiver;
a processor; and
a memory containing instructions executable by the processor
to receive a sound signal, comprising a voice data component and a uniquely identifying tone component from a first communication endpoint of a plurality of communication endpoints;
to continuously determine that two or more of the plurality of communication endpoints, each associated with at least one corresponding participant, are co-located when the sound signal comprising the unique identifying tone from the first communication endpoint is received from a second communication endpoint of the two or more endpoints; and
based on the determination of multiple communication endpoints being co-located, to at least one of
process the received sound signal by selectively altering, by the processor, the received sound signal, or
initiate an instruction to inhibit further contribution, to the sound signal, from at least one of the co-located multiple communication endpoints.

19. The system of claim 18, wherein the instructions contained in memory are further executable by the processor to detect a first signal component incorporated into the received sound signal at a first communication endpoint in response to initial audible reproduction of the first signal component by a second communication endpoint.

20. The system of claim 19, wherein the instructions stored in memory are further executable by the processor to generate an instruction to inhibit further contribution by the second communication endpoint in response to detection of the first signal component.

* * * * *